Sept. 21, 1965 M. R. KUEHNLE 3,207,827
METHOD OF MAKING HELICAL ARTICLE
Filed Jan. 9, 1961 5 Sheets-Sheet 1
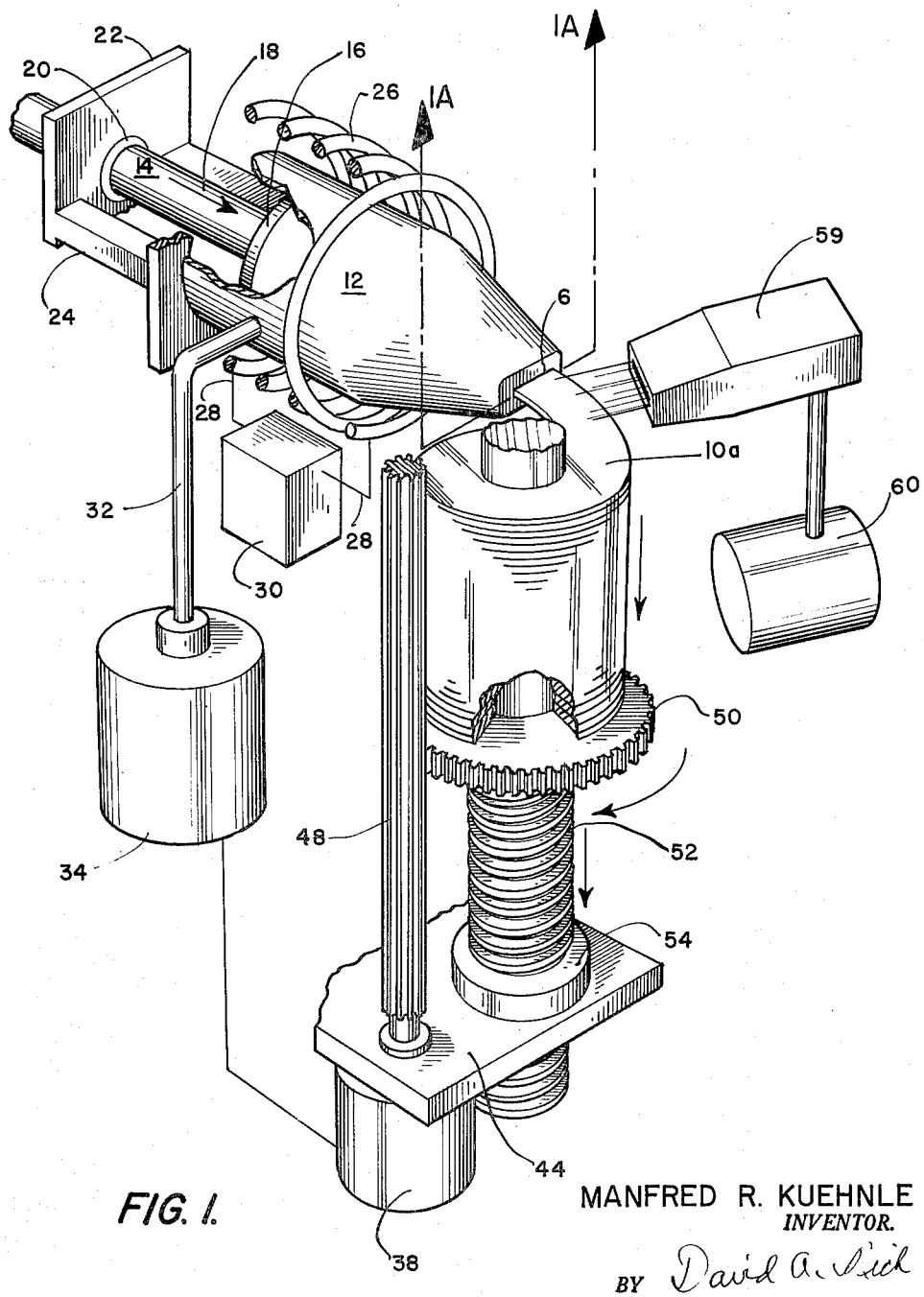
FIG. I.
MANFRED R. KUEHNLE
INVENTOR.
BY David A. Rich
ATTORNEY.

Sept. 21, 1965  M. R. KUEHNLE  3,207,827
METHOD OF MAKING HELICAL ARTICLE
Filed Jan. 9, 1961  5 Sheets-Sheet 2
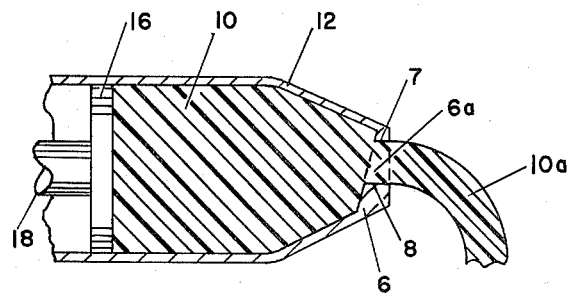
FIG. IA
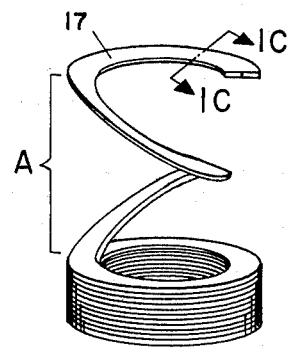
FIG. IB
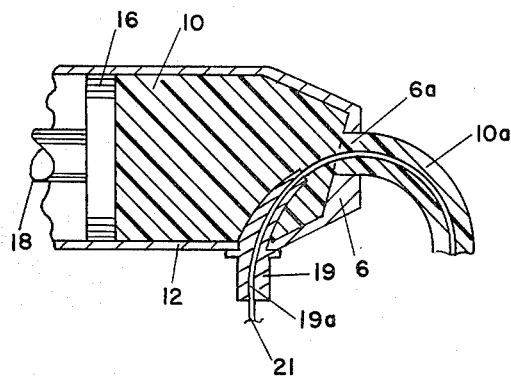
FIG. IF
FIG. IC
FIG. ID
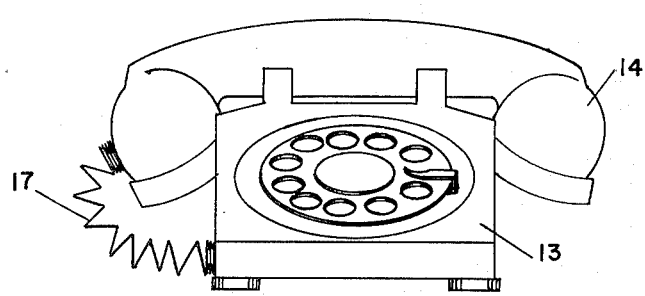
FIG. IE
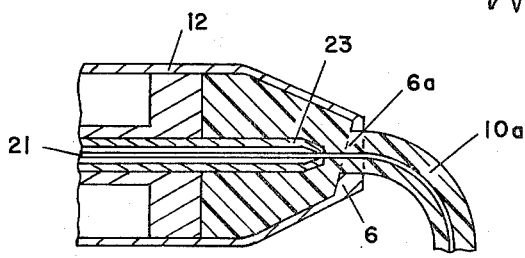
FIG. IG
MANFRED R. KUEHNLE
INVENTOR.
BY David A. Rick
ATTORNEY.

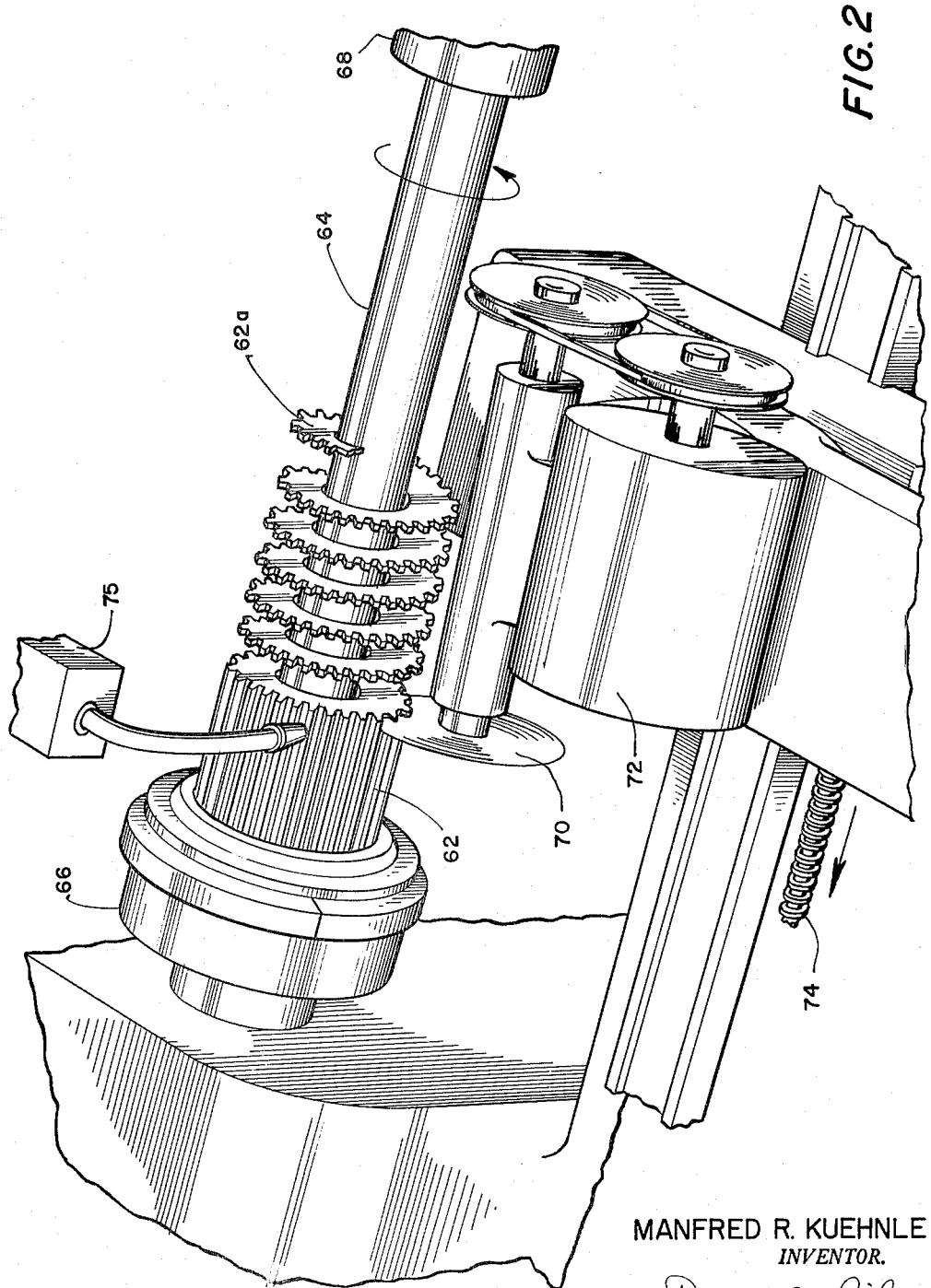

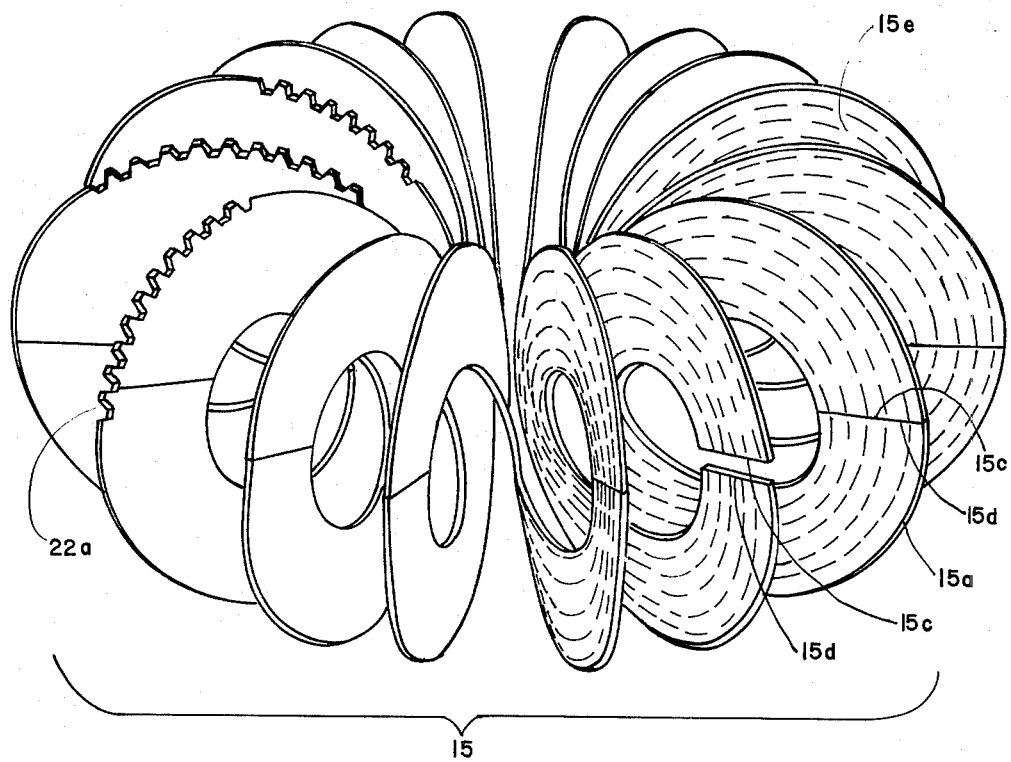

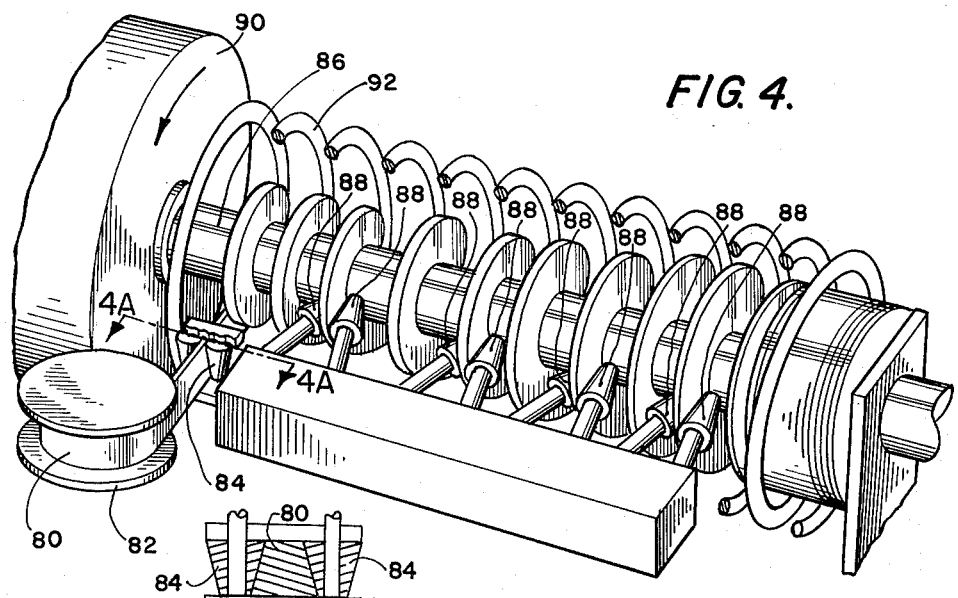
FIG. 4.
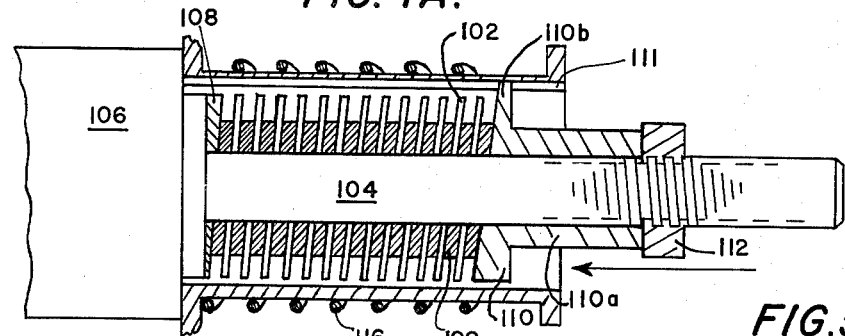
FIG. 4A.
FIG. 5A.
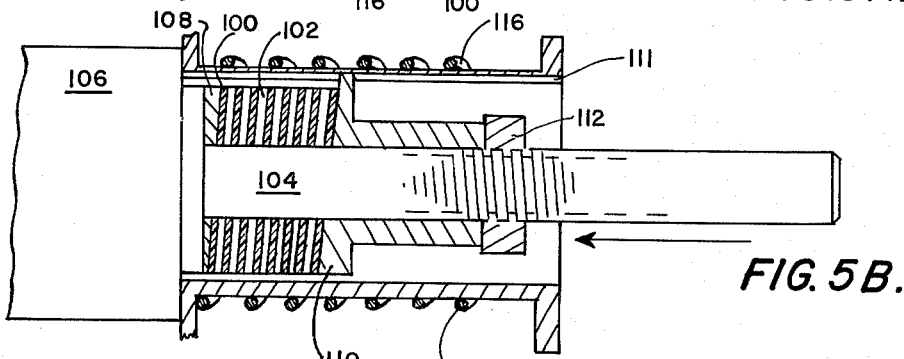
FIG. 5B.
MANFRED R. KUEHNLE
INVENTOR.
BY David A. Rick
ATTORNEY.

United States Patent Office 3,207,827
Patented Sept. 21, 1965

3,207,827
METHOD OF MAKING HELICAL ARTICLE
Manfred R. Kuehnle, Lexington, Mass., assignor to Itek Corporation, Lexington, Mass., a corporation of Delaware
Filed Jan. 9, 1961, Ser. No. 81,379
11 Claims. (Cl. 264—174)

This invention relates generally to the art of fabricating data processing articles into special shapes. More particularly, the invention relates to methods of forming edge coiled helices and the like. The term "edge coiled" as used herein, is intended to describe the form of helical coiling of a ribbon like material in which the smaller dimension of the ribbon, that is the thickness thereof, is parallel to a helical axis, while the larger dimension, that is the width of the ribbon, is perpendicular to a helical axis.

In my co-pending application, Serial No. 30,928, filed May 23, 1960, now abandoned, there is shown in one embodiment, a tape recorder using magnetic tape which is in the form of an edge coiled helical toroid. The techniques used for fabricating magnetic tapes that are known in the art, are not applicable to edge coiling. Magnetic tape is commonly made by slitting large sheets of plastic material, such as cellulose acetate or "Mylar" into long strips and spirally coiling the strips onto a spindle. In general, the tape has a thin rectangular cross-section, in order to provide the maximum amount of information storage in a given tape volume. In spirally coiling the tape about a spindle the rectangular section is so disposed that the flat surfaces of the tape are parallel to the axis of the spiral. The tape material being thin in the direction it is bent offers substantially no resistance, to such coiling. In contrast, edge coiling a tape requires the flat surfaces of the tape to be wound substantially perpendicular to a helical axis, whereby the tape offers a maximum amount of resistance to coiling. In edge coiling, the edges of the tape have to assume different circumferential lengths after coiling. Any attempt to wind a long strip of tape into an edge coiled configuration would result in a tearing of material at the outer radius, and a buckling of material at the innter radius. Therefore, known methods of coiling magnetic tape cannot be used to form an edge coiled tape.

The problems encountered in forming edge coiled magnetic tapes are generally common to those encountered in helically winding any article having a cross section that is substantially wider in a direction transverse to a helical axis than in a direction parallel thereto. It has been found that edge coiling a helical article, in some applications, gives a degree of extensibility to the article heretofore unknown for that article. A novel article that can be produced in accordance with the present invention is a new and improved extensible insulated electrical cable that is adapted for use in coupling the receiver to the base of a telephone hand set. Extensible insulated electrical cables presently known in the art for this purpose and adapted for us weith telephones are helically wound, but have a cross section in which the larger dimension is in a direction parallel to the helical axis. Edge coiling this cable leads to a degree of extensibility per lineal inch of helix that is greater than the prior art cables by an order of magnitude. The great increase in extensibility of the cable is due to several factors. First, one can obtain a greater number of helical turns per linear inch of helix when the wider dimension of the cable cross section is transverse to the helical axis, than when it is parallel thereto. In addition, when the cable is edge coiled, the cable material is so orientated relative to the helical axis that the material provides a minimum resistance to extensibility.

The storage and positioning mechanism used with roll film photographic readers bears a close resemblance to the corresponding mechanism previously discussed for magnetic tape recorders. Naturally, some differences exist because of the differences between the physical characteristics of photographic film and magnetic tape, but the basic components of mechanisms for handling either type of material are similar. For example, both mechanisms incorporate feed reels, takeup reels and tensioning devices of quite similar design. Because both roll film and magnetic tape are ribbon-like materials having a plastic base with either a relatively fragile coating thereon or are merely impregnated with sensitive material, it seems intuitive that improved apparatus for handling one material will also operate, with minor obvious mechanical differences, to handle the other. It will be understood, therefore, that, unless a difference is pointed out, reference hereinafter to "tape" or "magnetic tape" will include "roll film" or "photographic film."

It is known that metallic ribbons may be formed into edge-coiled helices. However, in such cases, the aspect ratio of such ribbons from which the helices are made does not exceed approximately 1:2. That is, the width of the strip is rarely more than twice the thickness thereof. When thin metallic ribbons, that is ribbons having a thickness in order of .010" or less, are to be formed, it is usually desired to avoid essentially all crimping of material.

When plastic tape is to be provided in edge-coiled helices, the present invention uses a novel extrusion process. A die having an orifice with cross-sectional dimensions equal to the desired cross-sectional dimensions of the tape to be extruded and a land which tapers in thickness from one side of the die to the other is used. When certain plastic materials are heated to a viscous state and forced through the die, a curved ribbon of the plastic material results. The curvature of the ribbon is dependent upon the viscosity of the plastic material and the pressure with which it is forced through the orifice, as well, of course, as the relative dimensions of the aperture in the die. After extrusion, the ribbon is cooled and led onto a rotating and moving element where it is supported in position so that after hardening of the ribbon a helical tape remains. Edge coiled insulated electrical cables may be formed by using the above process. To form a cable an electrical conductor is encapsulated in a viscous insulating material and forced through the die with the viscous material so that after hardening an edge coiled insulated electrical cable remains. The above described method is broadly applicable to extruding any elongated arcuate shape.

Another contemplated way of providing edge-coiled helices of plastic materials is to machine the desired shapes from a hollow cylindrical blank. Thus, a blank of material may be attached to an arbor, placed in position on a lathe or other turning apparatus and a continuous turning removed from the blank, starting at, or adjacent, one end thereof. By proper adjustment of the cutting tool to place it at an angle to the blank equal to the desired helix lead angle, essentially all tendency of the turning to break is eliminated. It may be advantageous in cutting to use a rotating tool and to provide lubricating and cooling means to improve the efficiency of the cutting.

Still another contemplated way of providing thin edge-coiled helices is to convert relatively thick tapes by rolling or by subjecting such tapes simultaneously to pressure and heat so that edge-coiled helices wound with the relatively thick plastic tapes are changed to the desired thin tapes. In one embodiment, a thick tape having a rectangular cross-section is first led off a spindle through a pair of rollers to change the original cross-section to a trapezoid, then loosely wound around a mandrel to form a helix thereabout, with the smaller of the bases of the trapezoid adjacent the mandrel. The tape is then moved lengthwise through a plurality of rolling stations wherein the cross-sectional shape of the tape is gradually changed from a trapezoid to a thin rectangle.

Still another contemplated way of providing thin edge-coiled helices is to punch out a plurality of rings from a sheet of weldable material. Each of the punched rings is split radially, and the successive rings are attached along the radial splits.

An object of the invention is to provide improved methods of manufacturing edge-coiled helically wound articles.

Another object of the invention is to provide improved methods of forming edge-coiled helically wound magnetic tape.

In accordance with the present invention there is provided a method of extruding elongated arcuate articles having a preselected cross-sectional configuration comprising heating an extrudable material to a viscous state. A portion of the material is extruded through the die orifice by applying a preselected pressure gradient to the material. The pressure gradient is so chosen as to cause the material to flow through the orifice along an axis and emerge therefrom tangential to the axis.

In accordance with the present invention there is still further provided a method of making thin-edged coiled rectangular tape having a preselected thickness, comprising the steps of spirally winding a tape having a rectangular cross section thicker than the preselected rectangular cross section. The tape is heated, unwound and passed lengthwise through a pair of rollers to convert the rectangular cross section of the tape to a trapezoidal cross section in which the height is greater than the longer and shorter bases thereof, then winding the tape around a rotating element with the shorter base nearer the rotating element to form a plurality of helical turns of tape around the rotating element. The tape is then passed through a plurality of rolling stations whereby the trapezoidal cross section of the tape is successively changed to a rectangular cross section having the preselected thickness.

For a better understanding of the present invention, together with other and further objects thereof, reference is made to the following description taken in connection with the accompanying drawings and its scope will be pointed out in the appended claims.

In the drawings:

FIG. 1 is a partially schematic, perspective view showing the disposition of elements in an operation for extruding plastic material into the form of a helical tape or ribbon in accordance with a preferred embodiment of the method;

FIG. 1A is a longitudinal section taken along the line 1A—1A in FIG. 1, showing a preferred form of the extrusion die of FIG. 1;

FIG. 1B is a perspective view showing an extensible insulated conductor made in accordance with the present invention;

FIG. 1C is a cross section of the insulated conductor of FIG. 1B taken along the line 1C—1C in FIG. 1B;

FIG. 1D is a cross section of a modification of the conductor shown in FIGS. 1B and 1C;

FIG. 1E is a front elevational view, partially schematic, of a telephone handset with an extensible insulated conductor made in accordance with the present invention;

FIG. 1F is a longitudinal section showing a preferred form of extrusion die for forming the insulated conductor shown in FIG. 1B;

FIG. 1G is a cross-sectional view of an alternate form of extrusion die for forming the insulated conductor of FIG. 1B;

FIG. 2 is a perspective view, partially schematic, illustrating a method of obtaining a helical tape by turning;

FIG. 3 is a perspective view illustrating a method of forming a helical toroid from a plurality of radially split rings;

FIG. 4 is a perspective view, partially schematic, illustrating a method of obtaining a helical tape by rolling; and FIGS. 5A and 5B are longitudinal sections, partially schematic, illustrating a method of obtaining a helical tape by pressing.

Referring now to the drawings, and with particular reference to FIG. 1, there is here shown the preferred method and apparatus for forming a curved ribbon of plastic material. More particularly, there is illustrated therein an apparatus for extruding an "edge-coiled" plastic base helical tape. The extrusion apparatus broadly includes a cylinder 12 having a plunger assembly 14 mounted therein for extruding material through a die 6. A movable platen in the form of gear 50 provides a support for the helical turns as they exit from the extrusion dies.

One of the essential features of this embodiment of the present invention is the shape of the extrusion die 6. Referring now to FIG. 1A there is shown a cross-sectional view of a preferred die for extruding a curved ribbon of plastic material taken along the line 1A—1A in FIG. 1. It is noted that the term "plastic material" when used herein includes but is not limited to such materials as cellulose acetate, or the material made by the DuPont Company of Delaware and known to the trade as "Mylar," or the like. Once again it should be noted that this embodiment of the present invention broadly applies to all extrudable materials. The orifice 6a of the die 6 is unsymmetrical, having a shorter land 7 and a longer land 8. In order to extrude the material into its desired shape, pressure is applied by means of a disc 16 on a charge 10, as will be described in more detail hereinafter. A portion of the charge 10 is forced through the orifice 6a. The friction between the charge 10 and the shorter land 7 is less than the friction between the charge 10 and the longer land 8, whereby a pressure gradient is applied to material flow through the orifice. Thus the portion of the charge 10 adjacent to the land 7 moves at a higher velocity than the portion of the charge 10 adjacent to land 8. In other words, a velocity gradient exists across the orifice 6a between the land 7 and land 8. Due to the fact that the material is in a viscous state, the velocity gradient causes a curvature of the ribbon 10 as it passes out of the orifice 6a.

The difference in operation between the illustrated die and dies ordinarily used in the extrusion of any plastic material may best be explained by referring to the standard formula used for calculating the flow of plastic non-Newtonian material through the orifice of a die. This formula is:

$$Q = Wh^3P/12uL$$

where:

$Q$ = the amount of plastic material passing through an orifice, in cubic inches per second;
$W$ = the width of the orifice, in inches;
$h$ = the height of the orifice, in inches;
$P$ = the pressure on the plastic material applied by the piston, in pounds per inch;
$u$ = the viscosity of the plastic material, in pounds–seconds per square inch;
$L$ = the length of the land of the orifice, in inches.

Since the designers of dies have always attempted to maintain the value of Q constant over the entire area of orifices, great care has always been observed to maintain the dimensions of orifices constant. However, in the present case, one of the orifice dimensions has been varied so that the amount of plastic material passing through the orifice varies across the width of the orifice. When small increments of width are considered, it is evident that, in the illustrated case, the change in the value is linear between an upper limit fixed by the length of the land 7 and a lower limit fixed by the land 8. To put it another way, the limiting values of Q in the contemplated die varies inversely with the length of the lands 7 and 8. Assuming that the viscosity of the plastic material is kept within limits to ensure the formation of a continuous ribbon of plastic material, it follows then that variation in the value of Q across the width of the orifice changes the shape of the extruded ribbon from a normal straight ribbon to a curved ribbon. It is contemplated, however, that the radius of curvature of the ribbon may be varied by individually varying viscosity, pressure, friction variation across the orifice, or any combination thereof.

Referring once again to FIG. 1 and FIG. 1A, an apparatus for extruding a helical tape is illustrated. In connection with FIG. 1, it should be noted that, in the interest of clarity, the drawing has been greatly simplified and made partially schematic. A charge 10 of the material to be extruded is placed within a cylinder 12, one end of which is open to accommodate a plunger assembly 14. The plunger assembly 14 may consist of a disc 16 of such a size as to have a sliding fit within the cylinder 12, and a shaft 18. The shaft 18, in turn, is supported in a journal bearing 20 in a supporting plate 22. Cylinder 12 is fixed to plate 22 as by supports 24. Thus the plunger assembly 14 and the cylinder 12 are held in the proper relative position, one with the other, to allow movement of plunger assembly 14 within the cylinder 12. As may be seen, plate 22 is shown as being partially broken away. The reason for this is pointed out in more detail below. Surrounding cylinder 12 is a heater 26. The mounting means for the heater 26 are not shown, it being understood that any convenient means for holding the heater 26 in a fixed position relative to cylinder 12 and charge 10 may be used. The heater 26 is shown as being formed in a helix, but it should be understood that too is not critical to the invention, any adequate form of heater being permissible. Heater 26 is connected through a pair of leads 28 to a source of electrical power 30. A pressure sensing means including a tube 32 is attached to the wall of the cylinder 12 for sensing pressure therein. Tube 32 is connected on its other end to a pressure regulator 34, for reasons to be explained in detail hereinafter. In connection with the tube 32 and the pressure regulator 34, it should be noted that, in practice, it may be desirable that both should be heated to the same extent as cylinder 12, for obvious reasons. Although the internal construction of the pressure regulator 34 is not shown, any type of many known types of pressure regulators may be used. For example, pressure regulator 34 may be constructed in a manner similar to an aneroid barometer in that a corrugated diaphragm may be placed within the pressure regulator 34 to divide its interior into an upper and lower chamber, the upper chamber being connected to the interior of the cylinder 12 through the pipe 32, and the lower chamber containing means responsive to the movement of the diaphragm for controlling the speed of a D.C. motor 38. The motor 38, in turn, is mounted on a base 44. The base 44 is shown partially broken away, it being understood that the base 44 in actuality extends beyond the broken away portion. From the foregoing, it is evident that the speed of the motor 38 may be controlled and be responsive to the pressure on the charge 10 in the cylinder 12. It should be apparent that other system variables such as heating, cooling, feed, etc., may likewise be controlled if necessary.

A shaft 46, extending upwardly from the motor 38, supports a gear 48. The gear 48, in turn, meshes with a gear 50. Attached to the lower side of gear 50 is a lead screw 52 passing down through a threaded nut 54 attached rigidly to the base 44. Extending upwardly from the gear 50 is a shaft 56, shown partially broken away, it being understood that the shaft 56 extends above the cylinder 12. Cooling means may also be provided to some advantage. As illustrated, the cooling means consists simply of an air jet provided from a nozzle 59 which in turn is connected to a source of compressed air 60 as shown. Under some conditions it may be desirable to replace the air jet with a chemical spray or a liquid bath. In the latter case, material emerging from the orifice would enter a tank of liquid in which the platen 50 would be located. The liquid would buoyantly support the tape before it reached the die; prevent adjacent helical turns from adhering to each other; and cure the material.

The apparatus operates as follows: after the charge 10 has been heated to a viscous state, disc 16 is moved to the right by moving shaft 18 to the right by means not shown but known to the art, forcing a portion of the heated material into contact with the entrance face 6b of the die 6. Material is forced through the orifice 6a along an axis to an exit face 6c. Due to the varying length of the channel between 6b and 6c a velocity gradient appears across the material flowing through the channel. The material leaving the exit face 6c leaves tangent to the axis of flow through the channel, whereby a continuous ribbon 10a of the charge 10 emerges from the die 6. Ribbon 10a is curved so as to fall on the upper side of the gear 50 which serves as a support for the ribbon 10a. Before the ribbon 10a touches the gear 50 the air jet from the nozzle 59 cools the ribbon so that it is substantially in its final condition. The speed of the motor 38 is adjustable in response to the pressure on the charge 10 and therefore is a measure of the speed at which the ribbon 10a is being extruded. Therefore, the gear 50 may be rotated at such a speed as to allow ribbon 10a to form one turn on the upper surface of the gear 50 for each revolution of the gear. At the same time, rotation of the gear 50 causes the lead screw 52 to rotate in the nut 54, causing the screw 50 to move away from the die 6. Thus it may be seen that the ribbon 10a is provided with a moving support on which it may rest without being stressed. It, however, may be necessary to determine empirically the proper relation of pressures, temperatures and speeds. In addition where extremely thin tapes are desired, it may be desirable to roll the extruded tape to reduce its thickness after it is extruded.

Many variations in the construction of the elements used in an extrusion process will be obvious to those having skill in the art. In particular, the extruder illustrated in FIG. 1 may be varied without deviating from the concept of the invention. This, a known screw-type adiabatic extruder may be used. As is well-known, sufficient heat is generated during the passage of the material to be extruded through a screw-type extruder to allow elimination of heating coil. If a screw-type extruder is used, it is obviously necessary to relocate the position of the pressure regular connection to the cylinder of the extruder so that the pressure of the completely plasticized charge may be detected. However, the change just cited and others of like character will be evident to those having ordinary skill in the art, and are not to be construed as affecting the inventive concepts herein.

Since the device shown in FIGS 1F and 1G are generally similar to that of FIG. 1A, like elements are indicated by identical reference numerals. Referring now to FIG. 1F, there is shown an apparatus for performing the preferred method of forming the insulated cables shown in FIG. 1B. The principle of forming the curved ribbon 10a in FIG. 1 is the same as that in FIG. 1A. However, the material of the charge 10 in FIG. 1F is an electrical insulating material. The cylinder 12 has a bending die 19 coupled to its wall. The bending die 19 has a curved channel 19a therein. The conductor 21 is fed through the channel 19a and is bent as it is passed therethrough. It is desirable that the exit of the bending die 19 be located as close as possible to the orifice 6a of the extrusion die so that the curvature of the conductor 21 may be controlled. A plurality of conductors may also be manufactured in accordance with the method illustrated in FIG. 1F with slight modification of the apparatus. A plurality of bending dies 19 may be radially spaced about the periphery of the cylinder, one for each conductor desired. In the alternative, the bending die 19 may be provided with a plurality of channels for bending more than one conductor at a time in parallel arcs. In extruding a plurality of conductors, it is desirable to preinsulate the conductors prior to extrusion. The conductor should be coated with an electrically insulating material that will not break down at the extrusion temperature. This will prevent any internal shorting of the conductors due to swimming of the conductors during extrusion or internal shorting of the conductors during flexing in actual use.

Referring now to FIG. 1B there is shown an extensible edged coil, helically wound, insulated electrical cable made by the extrusion process heretofore described. As shown in FIG. 1B the cable is wider in the direction transverse to the helical axis than in the direction parallel thereto. Edge coiling the cable as shown in FIG. 1B leads to a degree of extensibility, per lineal inch of helix, that is greater than prior art cables for the reasons heretofore discussed. The bracket A shown in FIG. 1B is illustrative of the extensibility of a single helical turn of the edge coiled helix. In FIG. 1C there is shown a cross section of the insulated conductor in FIG. 1B taken along the line 1C—1C in FIG. 1B. The insulated cable includes a conductor 21 encapsulated in an insulating material 10'. In the preferred embodiment the cable is rectangular in cross section, as shown in FIG. 1C. However, it may be desirable to make the cross sections elliptical to avoid sharp edges at the corners. It is contemplated in the present invention that other shapes which have their wider dimension transverse to the helical axis may also be used. The conductor 21 is shown as being circular in cross section, however it is to be understood that while a round conductor is preferable it is not essential to practicing the present invention.

An alternate form of the insulated cable is shown in section in FIG. 1D. The cable is similar to that shown in FIG. 1C except there are a plurality of conductors 21 encapsulated in the insulating material 10'. Although not shown in the drawing, it may be desirable that the conductors 21 have an insulating coating disposed on their surface before encapsulation in the insulating material in order to prevent internal shorting of the conductors during processing or in use.

Referring now to FIG. 1E, there is shown a front elevational view of a telephone handset embodying the present invention. The telephone handset includes a base 13 and a receiver 14, and an insulated electrical cable 17 coupling the receiver to the base. The insulated electrical cable shown schematically in FIG. 1E is similar to the cable shown in FIG. 1B, that is, it is wider transverse to the helical axis than parallel thereto. The telephone receiver base 13 and receiver 14 are the type well-known in the art and have not been described in detail. It will be apparent to those skilled in the art that the combination of a receiver, base and extensible cord of the type shown in FIG. 1E is broadly applicable to any reasonable modification of the receiver or the base. It is contemplated that the combination of this embodiment of the present invention will increase the extensibility per inch of cable of any telephone handset, independent of the particular design of the receiver and/or base, over sets using insulated cables that are known in the art.

Referring now to FIG. 1G there is shown an alternative method of forming the insulated conductor of FIG. 1B. In FIG. 1G the conductor 21 is fed through a guide 23. The guide 23 is centrally disposed in the cylinder 12 and allows the conductor to emerge substantially at the center of the extrusion die 6. The curvature of the insulating material 10a emerging from the die 6 will force the conductor 21 to bend and conform to the curvature. It is desirable that the conductor 21 be made of a highly ductile material such as copper. It is also desirable that the conductor be fed through the orifice 6a at a rate compatible with the flow of insulating material through the orifice. The method illustrated in FIG. 1G may also be used to form an insulated cable having a plurality of conductors as shown in FIG. 1D with slight modifications. For example, the guide 23 may be adapted to accommodate a plurality of conductors either with a single orifice or with multiple orifices at its end. Once again, it is desirable that the conductors be precoated with an electrically insulating material that will not break down at the extrusion temperature.

Turning now to FIG. 2, an apparatus for forming helical tape by turning from a blank is illustrated. Since the apparatus is a known lathe, the drawing has been simplified, to a great extent, by eliminating elements of the lathe which, while necessary to the operation of the lathe, are not essential to the proper understanding of the method. Thus, supporting elements, drive motors, and the like, are not shown. In the figure, a cylindrical block 62 of a plastic material is fitted over an arbor 64. The combination of parts is then placed in turning position on the lathe, one end of the block preferably being secured in the head stock 66 and driven thereby. The arbor is preferably driven at a greater speed than the block so that in taking up the sliced helix, it will compensate for minor growth of the helix, due to local heating by the tool 70. If desired, the arbor 62 may be driven at the tailstock. The cutting tool 70 is mounted in cutting relationship to the block 62. As illustrated, the cutting tool is a rotating tool arranged to perform climb cutting, being driven by its own power source 72. Power source 72, in turn, is connected to the lead screw 74 of the lathe so that it may be moved in the direction shown by the arrow C, as the block 62 and the arbor 64 are rotated. A jet of a cooling and lubricating medium, such as liquid air, may be provided from a source 75 as illustrated.

After the block 62 and the arbor 64 have been respectively locked in place between the head stock 66 and the tail stock 68, and the cutting tool 70 has been brought into cutting position with respect to the block 62 and the apparatus is energized, a continuous turning 62a is formed. The turning 62a is supported on the arbor 64 after it has been formed as shown at 64a. The angle between the cutting tool 70 and the block 62 is critical. The cutting tool should be so designed as to minimize the friction between its non-cutting surfaces and the material being cut. It will be understood that the type of material being cut will affect the actual tool shape. The cutting tool 70 must make an angle with respect to the longitudinal axis of the block 62 that is substantially equal to the helix lead angle. Such positioning eliminates, or at least greatly minimizes any tendency of the helical turn 62a to break. It should be noted that the method being discussed is particularly well adapted to the formation of straight gear teeth on the outer periphery of the helical turn 62a. In the preferred embodiment, the gear tooth form 63 is molded into the cylindrical block 62. In the alternative, the gear tooth may be milled or shaped in the block. The outer surface of the block 62 naturally adapts itself to straight gears as the individual turnings 62a are formed.

There are variations to the illustrated method which will be obvious to those having skill in the art. It would be possible to join the block 62 to the arbor 64 by providing an arbor having a forced fit with the block 62. In this case, it possibly would be advantageous to use a plastic arbor to ensure complete cutting of each of the turnings 62a. That is, the use of a plastic arbor would allow one to bring the cutting tool completely through the block 62 without danger of damage to the cutting tool 70. In like manner, the block 62 need not be hollow. In this case, an arbor would not be required. The cutting tool 70 would simply cut through a portion of the block 62, leaving an uncut core. In this case, of course, a separate operation would be required to punch out or otherwise remove such a core in order to provide a helical tape.

Referring now to FIG. 3, the constructional details of a magnetic tape for use according to the invention may be seen. It is noted that FIG. 3 illustrates a helically formed magnetic tape as it is finally being assembled to form a toroid. In this particular embodiment, the magnetic tape 15 consists of a number of sequentially joined ring-like sections 15a. Sections 15a are preferably formed by stamping rings of a desired size from a plastic base material, such as acetate, mylar or polyethylene. Each ring is then cut radially to form two edges 15c, 15d. Edge 15c of one ring 15a is then butted against edge 15d of the next ring 15a and the two edges 15c, 15d are welded together. A coating 15e of ferric oxide (or any other magnetic recording material) is applied to at least one surface of each ring 15a, as illustrated, to provide the required magnetic recording medium. Application of a coating 15e as well as formation of the gear teeth 22a obviously may be accomplished by known techniques either before or after the rings are joined.

It is self-evident that the foregoing method of construction need not necessarily be followed. As a matter of fact, the base need not consist of ring-like sections 15a supporting a magnetizable coating 15e but may be a helical coil, such as made by one of the other illustrated embodiments herein, and having only one joint formed from standard flat magnetic tape. Since the tape is essentially a magnetizable coating on or a magnetizable impregnation of a base of plastic material, any known method of joining the ends of such material may be used. For example, the tape may be placed in a fixture in which heat and pressure may be simultaneously applied so as to run the materials at the two ends together. In connection with this operation, it is highly desirable, of course, that care is taken to join the ends so that no discontinuity in the gear teeth results.

Referring now to FIG. 4, still another way of forming an edge coiled helical tape is illustrated. The method shown in FIG. 4 involves rolling the required tape using a relatively thick tape to start. A length of tape 80 to be worked on is spirally wound on a reel 82. The free end of the tape 80 is connected to a leader strip which is not shown. The leader strip is fed through the rolling station 84 and then helically wound on and over arbor 86, passing successively to additional rolling stations 88. Arbor 86, in turn, is mounted in a turning apparatus 90, and is surrounded by a heating element 92. After the heating element 92 is at a predetermined temperature, the arbor 86 is rotated and the tape 80 is passed through the various rolling stages as shown. In this connection, it should be noted that the rollers 84 and 88 are also positively driven by means not shown, so as to avoid kinking or buckling of the tape 80. That is, each of the rollers 88 may be essentially the same except each successive pair of rollers 88 is adjusted in roller spacing and to operate at successively higher speeds so as to compensate for the changing cross section of the tape as it passes through the rollers. Roller assembly 84 contains at least one pair of rollers whose rolling surfaces are not parallel to each other so as to change the cross-sectional shape of the tape coming off the reels 82 from a rectangular cross section to a trapezoidal cross section as shown in FIG. 4A. The rollers in the roller assembly 84 are so arranged at the smaller base of the trapezoid that the tape may be wound around the arbor 86. The trapezoid section is so chosen that the final form of tape will be of substantially uniform thickness despite the radial growth of the outer edge of the tape during rolling.

The remaining roller assemblies each contain at least one pair of rollers having rolling surfaces parallel to each other at the point of contact with the tape 80. The spacing between the rollers in each roller assembly 88, of course, is progressively less starting from the roller assembly 88 nearest to the roller assembly 84. As the tape passes through each roller assembly 88, its thickness is progressively reduced and its trapezoidal cross-sectional shape is changed back to a rectangular cross section. After passing through, say four rolling stations 88, the tape has finally attained its desired shape. The formed tape then is stored on the arbor 86 until all the tape 80 on the feed spool 82 has been removed and formed.

While the above embodiment has been described in terms of forming a helix from a single roll of tape, it will be apparent that a laminated helix can also be formed in a like manner. For example, several tapes may be fed to the rollers 84 at the same time and in face to face relation whereby the tapes will be laminated together as they pass through the rolling stages. In this connection, it might be desirable to use cylindrical rollers in contrast to the tapered rollers shown herein. It will be apparent that this embodiment of the invention is broadly applicable to any material that can be formed by hot rolling.

Referring now to FIGS. 5A and 5B, the principles of a method of forming an edge-coiled helical tape by squeezing are shown. A thick tape 100 is wound between the turns of a metallic helical spacer 102 on a spindle 104. Spindle 104 on its left hand side is rigidly attached to a base 106, and is threaded for some distance inwardly from its free end. The tape and the spacer are held in position along the spindle 104 between appropriately shaped shoulders 108 and 110. Shoulder 108, in turn, is attached rigidly to the base 106 while the shoulder 110 is capable of sliding along spindle 104. The nut 112 is engaged to the threaded portion of spindle 104 and spaced from the shoulder 110 by a spacer 110a integrally formed with shoulder 110.

The shoulder 110 has a radial key 110b extending therefrom for coupling with a guide 111 shown in FIGS. 5A and 5B. The guide prevents the shoulder from rotating in response to rotation of nut 112. The guide must be slightly longer than the full axial travel of the shoulder 110.

Surrounding the tape to be formed is a heater 116. After the heater 116 is energized so that the tape is softened, the nut 112 may be moved as shown in FIG. 5B. This movement of the nut compresses all the elements between the nut and the shoulder 108. The tape 100 is therefore forced to flow outwardly between the turns of the metallic spacer 102, thus changing its cross-sectional shape to the desired cross-sectional shape. After compression, the heater is deenergized and the assembly is allowed to cool under pressure so that the tape 100 is set in its final shape. It is preferable that the metallic spacer 102 be made from soft material, as copper, to minimize any chance that after forming and after releasing of pressure, the metallic spacer have any tendency to spring back to its original form, thus placing strains on the tape 100.

This method may also be used to form a laminated helix similar to the ones discussed in connection with FIG. 4. For example, two helices may be interwound so that their flat surfaces are juxtaposed. The metallic spacer would also be interwound to separate adjacent pairs of surfaces (the surfaces not to be laminated). Thus, the application of heat and pressure will laminate the desired juxtaposed helices.

It is noted here that, however a helical tape is formed, it will ordinarily be desirable to treat the tape further to put it in condition for use in apparatus. Thus, if a helical tape for use in a magnetic recorder is being made, it is obvious that a magnetic material must be applied to the tape. Any method for applying a magnetic material to tape may be used without departing from the invention. Thus a slurry consisting of finely divided magnetic particles in a binder may be made up and the tape dipped into such a slurry to coat the tape. The tape may be coated either on one side, or both sides, depending on its intended use. If, on the other hand, the helical tape is to be the base of a photographic film, a photosensitive coating may be applied using any known method therefor.

Although the invention has been described only in connection with the fabrication of a helix from a plastic material, it is evident that the concepts of the invention apply equally well to the fabrication of helices from other materials. In particular, if it is desired to produce a metallic helix, the methods described herein, with the exception of the extrusion process, are applicable, it only being necessary to vary the techniques in known manners.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A method of extruding elongated arcuate articles having a preselected cross-sectional configuration, comprising: heating an extrudable material to a viscous state; contacting a portion of said heated material with an extrusion die having an orifice therein corresponding to said preselected cross-sectional configuration; extruding a portion of said material through said die orifice by applying a preselected pressure gradient to said material, so chosen as to cause material to flow through said orifice along an axis and emerge therefrom tangential to said axis; and winding said extruded material on a rotating element to form said article.

2. The method of claim 1 wherein said extruded material is partially cured as it emerges from said orifice.

3. A method of extruding helically wound articles having a preselected cross-section configuration, comprising: heating an extrudable material to a viscous state; contacting a portion of said heated material with an extrusion die having an orifice therein corresponding to said preselected cross-section configuration; extruding a portion of said material through said die orifice by applying a preselected pressure gradient to said material so chosen as to cause said material to flow through said orifice along an axis and emerge therefrom tangential to said axis; and winding said extruded material on a rotating and translating element and perpendicular thereto to form successive turns of helical ribbon on said translating element.

4. The method of claim 3 wherein said extruded material is partially cured as it emerges from said orifice.

5. A method of forming edge-coiled helical tape having a rectangular cross section, comprising: heating an extrudable material to a viscous state; contacting a portion of said heated material with an extrusion die having an orifice therein corresponding to said rectangular cross section; extruding a portion of said material through said die orifice by applying a preselected pressure gradient to said material to cause said material to flow through said orifice along an axis and emerge therefrom as a continuous ribbon tangential to said axis; and winding said ribbon on its wider sides on a rotating and translating element to form successive turns of helical ribbon on said translating element.

6. A method of extruding a helically wound insulated electrical cable having a preselected cross-sectional configuration, comprising: heating an extrudable electrically insulating material to a viscous state; contacting a portion of said heated material with an extrusion die having an orifice therein corresponding to said preselected cross-sectional shape; extruding a portion of said material through said die orifice by applying a preselected pressure gradient to said material to cause said material to flow through said orifice along an axis and emerge therefrom tangential to said axis; simultaneously feeding an electrical conductor into said heated material as said material flows through said orifice whereby said conductor emerges from said orifice encapsulated in said material to form an insulated electrical cable; and winding said cable on a rotating and translating element to form successive turns of helical insulated electrical cable on said translating element.

7. A method of extruding a helically wound insulated electrical cable having a preselected cross-sectional configuration, comprising: heating an extrudable electrically insulating material to a viscous state; contacting a portion of said heated material with an extrusion die having an orifice therein corresponding to said preselected cross-sectional shape; extruding a portion of said material through said die orifice by applying a preselected pressure gradient to said material to cause said material to flow through said orifice along an axis and emerge therefrom tangential to said axis; simultaneously feeding a plurality of electrical conductors into said heated material as said material flows through said orifice whereby said conductors emerge from said orifice encapsulated in said material to form an insulated electrical cable; and winding said cable on a rotating and translating element to form successive turns of helical insulated electrical cable on said translating element.

8. The method in claim 6 wherein said conductor is coated with an electrically insulating material prior to contacting said heated material.

9. The method in claim 7 wherein said conductors are coated with an electrically insulating material prior to contacting said heated material.

10. A method of forming an edge-coiled helical insulated electrical cable having a substantially rectangular cross-section, comprising: heating an extrudable insulating material to a viscous state; contacting a portion of said heated material with an extrusion die having an orifice therein corresponding to said substantially rectangular cross-section; extruding a portion of said material through said die orifice by applying a preselected pressure gradient to said material to cause said material to flow through said orifice along a axis and emerge therefrom as a continuous ribbon tangential to said axis; simultaneously feeding an electrical conductor into said heated material as said material flows through said orifice whereby said conductor emerges from said orifice encapsulated in said material to form an insulated electrical cable; and winding said cable on its wider side on a rotating and translating element and perpendicular thereto to form successive turns of helical insulated electrical cable on said translating element.

11. An extrusion apparatus for forming a coiled helical tape of rectangular cross section having a pair of wide sides and a pair of narrow sides, the combination comprising:

means for heating an extrudable material to a viscous state;

entrance means coupled to the heating means adapted for flowing the viscous material therethrough along a given line;

exit means having an orifice therein corresponding to the preselected cross section configuration;

channel means coupling the entrance means to the exit means and having a non-uniform length along the given line to apply a velocity gradient to the material flowing through the channel means to cause the material to flow through the orifice along the given line and emerge therefrom as a continuous ribbon tangential to the given line;

means for partially curing the extruded material as it emerges from the exit means; and rotating and translating means winding the ribbon on its wide sides substantially perpendicular to the axis of rotation to form successive turns of helical ribbon on the translating means.

References Cited by the Examiner

UNITED STATES PATENTS

| | | | |
|---|---|---|---|
| 1,350,722 | 8/20 | Goodenberger | 18—12 |
| 1,370,800 | 3/21 | Egerton | 18—55 |
| 1,674,574 | 6/28 | Semple. | |
| 2,098,402 | 11/37 | Reifsteck et al. | 179—103 |

(Other references on following page)

UNITED STATES PATENTS

| | | | |
|---|---|---|---|
| 2,168,288 | 8/39 | Fischer | 18—12 |
| 2,191,993 | 2/40 | McLarn | 179—103 |
| 2,471,752 | 5/49 | Ingmanson | 18—55 |
| 2,491,527 | 12/49 | Spinner | 18—56 |
| 2,499,421 | 3/50 | Samler | 18—55 |
| 2,541,201 | 2/51 | Buecken et al. | 18—55 |
| 2,546,208 | 3/51 | Barton | 18—59 |
| 2,588,604 | 3/52 | Archer | 18—59 |
| 2,628,386 | 2/53 | Tornberg | 18—12 |
| 2,628,998 | 2/53 | Frisbie | 18—13 |
| 2,671,939 | 3/54 | Everhart et al. | 25—30 |
| 2,722,263 | 11/55 | Beare et al. | 18—13 |
| 2,751,658 | 6/56 | Gibboney | 25—39 |
| 2,902,083 | 9/59 | White | 18—13 |
| 2,920,351 | 1/60 | Hardesty et al. | 18—56 |
| 2,940,126 | 6/60 | Sheridan | 18—55 |

FOREIGN PATENTS 130,917  1/49  Australia.

ROBERT F. WHITE, *Primary Examiner.*

WILLIAM J. STEPHENSON, ALEXANDER H. BRODMERKEL, *Examiners.*